(12) United States Patent
Hoegele et al.

(10) Patent No.: US 11,187,522 B2
(45) Date of Patent: Nov. 30, 2021

(54) MEASURING APPARATUS AND METHOD FOR POSITIONING AND ALIGNING RETROREFLECTORS IN A DISTRIBUTION OF RETROREFLECTORS OF A MEASURING APPARATUS

(71) Applicant: Carl Zeiss Industrielle Messtechnik GmbH, Oberkochen (DE)

(72) Inventors: Wolfgang Hoegele, Rosenheim (DE); Christian Hoerr, Flintsbach am Inn (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 0 days.

(21) Appl. No.: 16/745,318

(22) Filed: Jan. 16, 2020

(65) Prior Publication Data

US 2020/0225026 A1     Jul. 16, 2020

(30) Foreign Application Priority Data

Jan. 16, 2019  (DE) .................. 10 2019 200 432.6

(51) Int. Cl.
*G01B 11/24*   (2006.01)
*G01B 11/00*   (2006.01)

(52) U.S. Cl.
CPC ............ *G01B 11/24* (2013.01); *G01B 11/005* (2013.01)

(58) Field of Classification Search
CPC ..... G01B 11/005; G01B 11/24; G01B 11/002; G01B 11/2518; G01S 17/34; G01S 17/66

USPC ................................................. 356/600–640
See application file for complete search history.

(56) References Cited

U.S. PATENT DOCUMENTS

| | | |
|---|---|---|
| 5,920,394 A | 7/1999 | Daniel et al. |
| 8,913,636 B2 | 12/2014 | Roos et al. |
| 9,559,486 B2 | 1/2017 | Roos et al. |
| 2016/0123718 A1 | 5/2016 | Roos et al. |

OTHER PUBLICATIONS

Daniel Clouse et al "Covering a Sphere With Retroreflectors", Jet Propulsion Laboratory, 2001 IEEE Aerospace Conference Proceedings (Cat. No. 01TH8542), DOI: 10.1109/AERO.2001.931380.
Benham Behroozpur Baghmisheh, Chip-scale Lidar, Technical Report No. UCB/EECS.2017-4.

(Continued)

*Primary Examiner* — Tri T Ton
(74) *Attorney, Agent, or Firm* — Falk Ewers; Ewers IP Law PLLC

(57) ABSTRACT

A measuring apparatus for determining object data of at least one test object includes at least one distribution of retroreflectors. The retroreflectors are arranged on the measuring apparatus. The distribution has at least so many retroreflectors that at least three retroreflectors are observable at at least three spatially different observation locations in at least 90% of all possible spatial orientations of the measuring apparatus. A distance range of the observation locations is 0.1 m to 30 m. Each of the retroreflectors has a maximum acceptance angle. Each of the retroreflectors has a diameter of 1 mm to 50 mm. The retroreflectors are arranged such that, for each of the observation locations, a minimum spacing of measured retroreflector distances of the observable retroreflectors is 0.1 mm to 50 mm.

12 Claims, 2 Drawing Sheets

(56) References Cited

OTHER PUBLICATIONS

Creaform/AMETEK, The complete solution for dimensional inspection in quality control applications, Aug. 25, 2016, https://wrnnv.creaform3d.com/sites/defaulVfiles/assets/brochures/files/qualitycontrol_brochure_en_hq_2508201 6.pdf.
Youtube video: EMS Creaform MetraSCAN 3D Scanning & Probing System, Dec. 29, 2017, URL: https://www.youtube.com/watch?v=N2D4chartCk [retrieved on Apr. 12, 2019].
Office Action issued in German Patent Application No. DE 10 2019 200 432.6 (from which this application claims priority), dated Dec. 11, 2019 and English language machine translation thereof.

MEASURING APPARATUS AND METHOD FOR POSITIONING AND ALIGNING RETROREFLECTORS IN A DISTRIBUTION OF RETROREFLECTORS OF A MEASURING APPARATUS

CROSS REFERENCE TO RELATED APPLICATIONS

This application claims priority to German patent application DE 10 2019 200 432.6, filed Jan. 16, 2019, the entire content of which is incorporated herein by reference.

TECHNICAL FIELD

The disclosure relates to a measuring apparatus for determining object data of at least one test object, an apparatus for determining at least one spatial position and orientation of at least one measuring apparatus, and a method for positioning and aligning retroreflectors in a distribution of retroreflectors of a measuring apparatus. In particular, the present disclosure relates to the field of coordinate measuring technology for measuring components.

BACKGROUND

The position and orientation of rigid objects can be determined by a variety of known measurement principles. To this end, active or passive markers are typically attached to the object to be tracked and the object is measured by active or passive measuring devices, which observe the object.

By way of example, passive markers, for example retroreflectors, may be attached to the object and an active measuring device, for example a light detection and ranging (LIDAR) distance measurement or infrared (IR) cameras with an IR flash, can measure said markers. The position of the object can be calculated by trilateration or multilateration. The relative positions of the markers with respect to one another may be known a priori by way of the construction or by a preceding calibration. Then, the orientation of the test object can be calculated indirectly by way of a so-called "rigid body fit". Here, the measured marker positions are aligned on a reference point list by error minimization. This approach differs from the principle of triangulation, which determines at least two angles in relation to a base for each marker for the purposes of determining 3D or 6D information items of the object to be tracked, said triangulation typically being realized by a measurement with area cameras or by a direct measurement of angles. By contrast, trilateration or multilateration is based on distance measurements to the at least three retroreflectors.

If the object with the attached passive markers is observed by such a distance measuring appliance, the goal is that of back-calculating position and orientation of the object from the distribution of the observed distances from the markers from the different observation locations. To this end, both a selected number of markers and a selected arrangement of the markers on the object is required.

In the field of astrophysics, an arrangement of retroreflectors on a canister for a surface sample from Mars for a potential Mars mission with the intention of maximizing a usable aperture of a set of corner-cube retroreflectors, taking account of interference effects with an adverse action, is described in, e.g., "COVERING A SPHERE WITH RETROREFLECTORS", Daniel Clouse et al., Jet Propulsion Laboratory, 2001 IEEE Aerospace Conference Proceedings (Cat. No. 01TH8542), DOI: 10.1109/AERO.2001.931380. By contrast, for industrial applications, such as coordinate measuring machines, a minimum number of observations should be guaranteed over all orientations. Further, in Daniel Clouse et al., the spatial arrangement of the corner-cube retroreflectors is restricted to a sphere, while any object is conceivable for industrial applications. Finding a suitable marker distribution requires substantially more outlay and is substantially more complex.

Further, known marker distributions, e.g., typically symmetric arrangements of markers, may not obtain a uniqueness quantification between position or orientation and received marker signal over all relevant observation locations on account of symmetry. Additionally, a marker distribution with many markers may be disadvantageous since signals may potentially only be separated poorly.

SUMMARY

It is therefore an object of the present disclosure to provide a measuring apparatus, an apparatus for determining at least one spatial position and orientation of at least one measuring apparatus and a method for positioning and aligning retroreflectors in a distribution of retroreflectors of a measuring apparatus, which at least largely avoid the disadvantages of known apparatuses and methods. In particular, a marker distribution is provided that guarantees a determination of 6D information items at different observation locations.

The object is achieved by an apparatus and a method for determining object data of at least one test object as described herein.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. By way of example, the expression "A exhibits B", "A has B", "A comprises B" or "A includes B" can refer either to the situation in which, apart from B, no further element is present in A (i.e., to a situation in which A exclusively consists of B), or to the situation in which, in addition to B, one or more further elements are present in A, for example element C, elements C and D or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the disclosure, as will be recognized by the person skilled in the art, can also be carried out using other configurations. Similarly, features introduced by "in one embodiment of the disclosure" or by "in one exemplary embodiment of the disclosure" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

According to a first aspect of the present disclosure, a measuring apparatus for determining object data of at least one test object includes at least one distribution of retroreflectors.

The retroreflectors are arranged on the measuring apparatus. The distribution has at least so many retroreflectors that at least three retroreflectors are observable from at least three spatially different observation locations in at least 90% of all possible spatial orientations of the measuring apparatus. A distance range of the observation locations is 0.1 meter (m) to 30 m. Each of the retroreflectors has a maximum acceptance angle. Each of the retroreflectors has a diameter of 1 millimeter (mm) to 50 mm. The retroreflectors are arranged in such a way that, for each of the observation locations, a minimum spacing of measured retroreflector distances of the observable retroreflectors is 0.1 mm to 50 mm.

A "test object" in the context of the present disclosure can be understood to mean an object to be measured that has any shape. By way of example, the test object can be a component that is scanned by the measuring apparatus. Within the scope of the present disclosure, "object data" can be understood to mean information items about the test object determined with the measuring apparatus, for example a spacing between the measuring apparatus and test object, in particular a surface of the test object, and/or a surface condition of the test object. By way of example, object data may include one or more reflection properties such as basic color, reflectance, translucence, etc.

Within the scope of the present disclosure, a "measuring apparatus" can be understood to mean an apparatus that is configured to scan the test object and determine object data, in particular to measure the test object. The measuring apparatus may include at least one sensor, which is configured to determine 3D coordinates of the surface. The measuring apparatus may include at least one scanner, more particularly a line scanner. The measuring apparatus may be a hand-guided measuring apparatus.

The measuring apparatus includes at least one distribution of retroreflectors. A "retroreflector" can be understood to mean an apparatus that substantially reflects an incident light beam back into the incoming direction. Below, a retroreflector may also be denoted generally as a "marker", which "marks" a location in the distribution. By way of example, the retroreflectors may have and/or be cat's eye retroreflectors. The retroreflector can be a passive marker. A "passive" marker can be understood to mean a retroreflector that is configured to receive a used signal, in particular an incident light beam.

A "distribution" of retroreflectors can be understood to mean a plurality of retroreflectors that are arranged at different spatial positions on the measuring apparatus and that have different orientations with respect to the measuring apparatus. By way of example, the distribution may include 20, 40, or more retroreflectors. Typically, the number of retroreflectors can be kept as low as possible for reasons of costs, weight and/or other technical reasons, for example the complexity of an evaluation. "Arranged at the measuring apparatus" can be understood to mean a fixed and/or changeable arrangement of the retroreflectors with respect to the measuring apparatus. The retroreflectors can be arranged on the measuring apparatus in such a way that the spacing between measuring apparatus and each of the retroreflectors is smaller than a given maximum spacing. The retroreflectors can be arranged outside of the measuring apparatus. By way of example, the retroreflectors can be connected to the measuring apparatus with at least one optional attachment. By way of example, the retroreflectors may be attached in holders constructed at the measuring apparatus. The retroreflectors can be arranged typically as close as possible to the measuring apparatus. The retroreflectors can be attached within a sphere with a diameter of less than 500 mm, by preference 250 mm, or outside of the measuring apparatus with a spacing of 0 mm to 150 mm from the surface of the measuring apparatus. The retroreflectors can be arranged in such a way that, with their physical extent, they do not collide with the measuring apparatus. By way of example, the retroreflectors can be arranged outside of a certain region, for example in the form of a box.

The retroreflectors can be arranged at the measuring apparatus in such a way that there is minimal mutual shadowing of the retroreflectors and/or said retroreflectors are shadowed by the measuring apparatus to a minimal extent. This condition may restrict an acceptable physical extent of the retroreflectors. In particular, this condition may have an influence on the number of observable retroreflectors.

The distribution has at least so many retroreflectors that at least three retroreflectors are observable from at least three spatially different observation locations in at least 90% of all possible spatial orientations of the measuring apparatus. The at least three observation locations need not necessarily see the same at least three retroreflectors. An "observation location" can be understood to mean any location from where a distance measurement to a retroreflector takes place. A minimum number of retroreflectors of the distribution can be set by virtue of, in sum, sufficiently many distance measurements, in particular six, being present for a calculation of orientation and positioning of the measuring apparatus from the at least three observation locations, wherein at least two retroreflectors must be visible from at least two observation locations. The distribution can have at least so many retroreflectors that a number of retroreflectors observable at the at least three spatially different observation locations in at least 90% of all possible spatial orientations of the measuring apparatus is 3 to 40, more particularly 3 to 20 retroreflectors. Within the scope of the present disclosure, "spatially different observation locations" can be understood to mean spatially different positions from where an active distance measurement takes place. "Observable" can be understood to mean that the retroreflectors are visible from the observation location, in particular that a light beam reflected by the respective retroreflector is capturable, more particularly measurable, from a distance measuring apparatus at the observation locations.

A distance range of the observation locations is 0.1 m to 30 m. A "distance range" can be understood to mean a spacing from the measuring apparatus, in particular one of the retroreflectors, to the observation location. The distance range can be set by a minimum and a maximum spacing of the observation locations from the measuring apparatus. Typically, the distance range of the observation locations can be 2 m to 13 m. This requirement in respect of the distribution of the retroreflectors may increase a minimum number of the required retroreflectors.

Each of the retroreflectors has a maximum acceptance angle. The maximum acceptance angle is an angle in a range from 1° to 90°. Each of the retroreflectors may have an individual maximum acceptance angle relative to the alignment normal. This allows an acceptance cone to be spanned around the alignment normal. Retroreflectors may have a finite acceptance angle relative to the alignment normal, within which they can receive light and reflect the latter again. By way of example, the maximum acceptance angle can be a half angle of up to 70°. By way of example, each of the retroreflectors may have a maximum acceptance angle of 60° to 90°.

The extent of each of the retroreflectors, also referred to as envelope of the marker dimension, has a diameter of 1 mm to 50 mm. Typically, the extent of each of the retroreflectors can have a diameter of 5 mm to 15 mm. The retroreflectors can have such a high reflectance that an at least measurable signal is capturable in an overall region of all observation locations. By way of example, distances can still be measured when an intensity of the reflected light is larger than a predetermined or predeterminable minimal intensity. "Measurable" can be understood to mean a signal that allows a distance measurement with a certain accuracy or quality. By way of example, a signal can be measurable if the signal meets at least one quality criterion. A signal can be considered to be non-measurable or not sufficiently measurable if a measurement error is larger than a predetermined or predeterminable maximum measurement error. By way of example, a signal may be considered non-measurable or not sufficiently measurable if a standard deviation in the distance measurement is $\sigma \geq 50$ μm, in particular $\sigma \geq 100$ μm. This condition may lead to an increase in the physical extent of the retroreflectors since the retroreflectors are then able to capture more light and hence also reflect more light.

The retroreflectors are arranged in such a way that, for each of the observation locations, a minimum spacing of measured retroreflector distances of the observable retroreflectors is 0.1 mm to 50 mm. Typically, the minimum spacing of measured retroreflector distances of the observable retroreflectors can be 0.5 mm to 10 mm. A "retroreflector distance", also referred to as marker distance, can be understood to mean distance measurement of the distance measuring apparatus to a retroreflector. A distance distribution can be such that an overshoot of a minimum spacing of all measured retroreflector distances is maximized for all spatial orientations of the measuring apparatus and observation locations. This condition can dominantly determine the position and orientation of the retroreflectors with respect to one another. Retroreflector distances are declared invalid and/or not measured below the minimum spacing. The minimum spacing of the measured retroreflector distances can set the spacing of the retroreflector distances from which the distance measuring apparatus can determine the distances with a predetermined reliability and/or accuracy. If undershot, no distances can be determined to the retroreflectors involved in the undershoot.

In one exemplary embodiment, the distribution of the retroreflectors may have the parameters set forth below. The number of retroreflectors may be 20. All retroreflectors can potentially be observed simultaneously by the distance measuring apparatus. A finite acceptance angle relative to the alignment normal can be 70°. The retroreflectors can be spherical with a 10 mm diameter dimension. A minimum spacing of the measured retroreflector distances can be 5 mm. If this minimum spacing is undershot, all involved distances are classified as "not measured". A region in which the retroreflectors may not be situated, in the form of a box in this case, can have dimensions of 140 mm×60 mm×140 mm (x-axis x y-axis x z-axis). All retroreflectors can be arranged at a spacing of <125 mm from the center of this region. For such an arrangement of the retroreflectors, at least three distances may be measurable in more than 90% of all alignments for a single observation location with spacings of 2 to 12 m from the measuring apparatus. By way of example, the 20 retroreflectors may be arranged as specified in the following table, where x, y, and z are the coordinates of the 20 markers and nx, ny, and nz are coordinates of the associated alignment normal:

TABLE 1

| X[mm] | y[mm] | z[mm] | nx | ny | nz |
|---|---|---|---|---|---|
| 8.3660 | 2.1340 | −2.8660 | 0.5774 | −0.5774 | −0.5774 |
| 7.5000 | 4.4013 | −1.4648 | 0 | 0.9342 | 0.3568 |
| −8.0352 | 3.5000 | 3.4013 | −0.3568 | 0 | 0.9342 |
| −8.0352 | 3.5000 | 0.5987 | −0.3568 | 0 | −0.9342 |
| 7.8660 | −2.6340 | 0.1340 | 0.5774 | 0.5774 | −0.5774 |
| 7.0000 | −4.9013 | 1.5352 | 0 | −0.9342 | 0.3568 |
| −6.6340 | −4.8660 | 1.8660 | 0.5774 | −0.5774 | 0.5774 |
| −8.9013 | −3.4648 | 1.0000 | −0.9342 | 0.3568 | 0 |
| −0.8660 | −3.8660 | 6.1340 | −0.5774 | −0.5774 | −0.5774 |
| 0.5352 | −3.0000 | 8.4013 | 0.3568 | 0 | 0.9342 |
| 6.6340 | −0.8660 | 8.3660 | −0.5774 | −0.5774 | 0.5774 |
| 8.9013 | 0.5352 | 7.5000 | 0.9342 | 0.3568 | 0 |
| 6.1340 | 4.8660 | 3.1340 | −0.5774 | 0.5774 | −0.5774 |
| 8.4013 | 3.4648 | 4.0000 | 0.9342 | −0.3568 | 0 |
| −6.6340 | −1.1340 | 8.3660 | 0.5774 | 0.5774 | 0.5774 |
| −8.9013 | −2.5352 | 7.5000 | −0.9342 | −0.3568 | 0 |
| 2.0000 | −4.0000 | −4.0000 | 0 | −0.9342 | −0.3568 |
| 0 | 4.0000 | −2.0000 | 0 | 0.9342 | −0.3568 |
| −0.8660 | 4.8660 | −6.1340 | −0.5774 | 0.5774 | 0.5774 |
| 0.5352 | 4.0000 | −8.4013 | 0.3568 | 0 | −0.9342 |

According to a further aspect, an apparatus for determining at least one spatial position and orientation of at least one measuring apparatus is provided. The apparatus includes at least one measuring apparatus according to one of the exemplary embodiments described above or further below. For details in respect of the apparatus, more particularly the measuring apparatus, reference is made to the description of the measuring apparatus found above and further below.

The apparatus can be configured to track the measuring apparatus. "Tracking" can be understood to mean following a movement of the measuring apparatus at various times. In particular, there can be a continuous measurement of a 6D information item, i.e., the spatial position and orientation, of the measuring apparatus that is movable in space. In particular, there can be 6D-tracking of the measuring apparatus, in which the spatial position and orientation, for example three Cartesian spatial coordinates, and the spatial alignment or orientation, for example three spatial alignments, of the measuring apparatus are determined and tracked in time.

The spatial position and the orientation can be determined in a coordinate system, for example a Cartesian coordinate system or a spherical coordinate system. Other coordinate systems are also conceivable. An origin or zero of the coordinate system can be at a point of the apparatus. A spatial position can be understood to mean a three-dimensional point (X, Y, and Z) in the coordinate system, in particular a position of the measuring apparatus. An orientation can be understood to mean an alignment of the measuring apparatus, in particular an angular position in the measurement volume. The orientation can be specified by at least three angles, for example a Euler angle or inclination angle, a roll angle, and a yaw angle.

The apparatus includes at least one active distance measuring apparatus and at least one evaluation unit. A "distance measuring apparatus" can be understood to be an apparatus that is configured to determine, in particular measure, at least one spacing to an object. An "active" distance measuring apparatus can be understood to be a distance measuring apparatus that is configured to actively emit a used signal in the form of electromagnetic waves. The distance measuring apparatus is configured to determine respectively one distance to at least three retroreflectors of the measuring apparatus from at least three spatially different observation locations. The distance measuring apparatus can be configured to be able to determine a plurality of distance measurements from an observation location to a plurality of retroreflectors, either simultaneously or with a negligible delay within the scope of the application.

By way of example, the distance measuring apparatus may include a LIDAR unit. A LIDAR unit can be understood to mean an apparatus that is based on the LIDAR measurement principle, which is also referred to as laser detection and ranging (LADAR).

The distance measuring apparatus can include at least one illumination apparatus, which is configured to illuminate at least one retroreflector of the measuring apparatus. In an exemplary embodiment as a LIDAR unit, the illumination apparatus can be configured to generate at least one frequency-modulated input light beam, a so-called "frequency modulated continuous wave" (FMCW). The LIDAR unit can be configured to generate the input light beam, the frequency of which is tuned continuously, according to the FMCW method. By way of example, the frequency of the input light beam can be linearly modulated with time. In principle, a combination of LIDAR method and FMCW method is known to a person skilled in the art, for example from Chip-scale Lidar, Benham Behroozpur Baghmisheh, Technical Report No. UCB/EECS.2017-4. By way of example, the LIDAR unit can be configured like in U.S. Pat. Nos. 9,559,486 B2, 8,913,636 B2, or US 2016/123718 A1.

An "illumination apparatus" can be understood to mean an apparatus configured to produce a light beam. In the context of the present disclosure, "light" can be understood to mean electromagnetic radiation in at least one spectral range selected from the visible spectral range, the ultraviolet spectral range, and the infrared spectral range. The term visible spectral range encompasses, in principle, wavelengths of 380 nanometers (nm) to 780 nm. The term infrared (IR) spectral range encompasses, in principle, wavelengths of 780 nm to 1000 micrometers (µm), wherein the range of 780 nm to 1.4 µm is designated as near infrared (NIR), and the range of 15 µm to 1000 µm is designated as far infrared (FIR). The term ultraviolet encompasses, in principle, wavelengths of 100 nm to 380 nm. IR light, that is to say light from the infrared spectral range, is typically used in the context of the present disclosure. The term "light beam" can be understood to mean, in principle, a quantity of light which is emitted in a specific direction. The illumination apparatus can have at least one light source. The illumination apparatus can have at least one FMCW light source. The illumination apparatus can have at least one adjustable (tuneable) laser source, for example at least one distributed feedback (DFB) laser diode or a Distributed Bragg Reflector (DBR) laser diode.

In this case, "an evaluation unit" can generally be understood to mean an electronic apparatus configured to evaluate signals generated by the distance measuring apparatus. By way of example, one or more electronic connections between the distance measuring apparatus and the evaluation unit can be provided for this purpose. The evaluation unit can include, e.g., at least one data processing apparatus, for example at least one computer or microcontroller. The data processing apparatus can have one or more volatile and/or non-volatile data memories, wherein the data processing apparatus can be configured for example in terms of programming to actuate the distance measuring apparatus. The evaluation unit can furthermore include at least one interface, for example an electronic interface and/or a human-machine interface, e.g., an input/output apparatus such as a display and/or a keyboard. The evaluation unit can be constructed for example centrally or else in a decentralized manner. Other configurations are also conceivable. The evaluation unit can have at least one A/D converter.

The evaluation unit is configured to determine the spatial position and orientation of the measuring apparatus from the distances determined by the distance measuring apparatus. The evaluation unit can be configured to determine the spatial position and orientation of the measuring apparatus using a trilateration or multilateration method. Such methods are known to the person skilled in the art.

according to a further aspect, a method is provided for the determination of a distribution of retroreflectors of a measuring apparatus, more particularly a determination of a number of retroreflectors and/or a positioning and/or an alignment of retroreflectors. In the method, use is made of a measuring apparatus according to one of the exemplary embodiments described above or further below. A target function is optimized in the method. The target function has at least three position parameters and at least three orientation parameters for each retroreflector. The target function is optimized over a plurality of orientations of the measuring apparatus in respect of a plurality of observation locations.

In this case, the method steps can be carried out in the order specified, wherein one or more of the steps can at least partly also be carried out simultaneously and wherein one or more of the steps can be multiply repeated. Furthermore, further steps can additionally be performed independently of whether or not they are mentioned in the present application. For details in respect of the method according to the disclosure, reference is made to the description of the apparatuses according to the disclosure.

A "target function" can be understood to mean a function that assigns a quality value to a distribution of the retroreflectors on the measuring apparatus. Optimizing the target function may include maximizing or minimizing the target function. The position parameters and orientation parameters may be degrees of freedom of the retroreflectors. The target function can be optimized in such a way that all above-described conditions of the distribution of the retroreflectors are satisfied to the best possible extent. To this end, a statistic of the observable retroreflectors over all orientations of the measuring apparatus in respect of the plurality of observation locations, which covers all meaningful distances for the used tracking volume, can be used as a target function.

The method may further have an alignment step. In the alignment step, optimal alignment normals may be determined for a given number of retroreflectors, in such a way that at least three retroreflectors are observable for all orientations of the measuring apparatus, for example when ignoring mutual shadowing of the retroreflectors. If the acceptance angle is identical for all retroreflectors, a solution to the Thomson problem, https://de.wikipedia.org/wiki/Thomson-Problem, can be used for example as a basis for such a uniform distribution in the angle range.

In summary, in the context of the present disclosure, the following exemplary embodiments are provided:

Exemplary Embodiment 1

Measuring apparatus for determining object data of at least one test object comprising at least one distribution of retroreflectors, wherein the retroreflectors are arranged on the measuring apparatus, wherein the distribution has at least so many retroreflectors that at least three retroreflectors are observable from at least three spatially different observation locations in at least 90% of all possible spatial orientations of the measuring apparatus, wherein a distance range of the observation locations is 0.1 m to 30 m, wherein each of the retroreflectors has a maximum acceptance angle, wherein an extent of each of the retroreflectors has a diameter of 1 mm to 50 mm, wherein the retroreflectors are arranged in such a way that, for each of the observation locations, a minimum spacing of measured reflector distances of the observable retroreflectors is 0.1 mm to 50 mm.

Exemplary Embodiment 2

Measuring apparatus according to the preceding exemplary embodiment, wherein the distribution has at least so many retroreflectors that a number of retroreflectors observable at the at least three spatially different observation locations in at least 90% of all possible spatial orientations of the measuring apparatus is 3 to 40, more particularly 3 to 20 retroreflectors.

Exemplary Embodiment 3

Measuring apparatus according to any one of the preceding exemplary embodiments, wherein the distance range of the observation locations is 2 m to 13 m.

Exemplary Embodiment 4

Measuring apparatus according to any one of the preceding exemplary embodiments, wherein each of the retroreflectors has a maximum acceptance angle of 1° to 90°, typically of 60° to 90°.

Exemplary Embodiment 5

Measuring apparatus according to any one of the preceding exemplary embodiments, wherein the extent of each of the retroreflectors has a diameter of 5 mm to 15 mm.

Exemplary Embodiment 6

Measuring apparatus according to any one of the preceding exemplary embodiments, wherein the minimum spacing of measured retroreflector distances of the observable retroreflectors is 0.5 mm to 10 mm.

Exemplary Embodiment 7

Measuring apparatus according to any one of the preceding exemplary embodiments, wherein the retroreflectors are arranged at the measuring apparatus in such a way that a spacing between the measuring apparatus and each of the retroreflectors is smaller than a given maximum spacing.

Exemplary Embodiment 8

Measuring apparatus according to the preceding exemplary embodiment, wherein the retroreflectors are arranged within a sphere or at a surface of the measuring apparatus.

Exemplary Embodiment 9

Measuring apparatus according to any one of the preceding exemplary embodiments, wherein the retroreflectors have such a high reflectance that an at least measurable signal is capturable in an overall region of all observation locations.

Exemplary Embodiment 10

Measuring apparatus according to any one of the preceding exemplary embodiments, wherein the retroreflectors are arranged at the measuring apparatus in such a way that there is minimal mutual shadowing of the retroreflectors and/or said retroreflectors are shadowed by the measuring apparatus to a minimal extent.

Exemplary Embodiment 11

Measuring apparatus according to any one of the preceding exemplary embodiments, wherein the retroreflectors are cat's eye retroreflectors.

Exemplary Embodiment 12

Apparatus for determining at least one spatial position and orientation of at least one measuring apparatus, wherein the apparatus comprises at least a measuring apparatus according to any one of the preceding exemplary embodiments, wherein the apparatus comprises at least one active distance measuring apparatus and at least one evaluation unit, wherein the distance measuring apparatus is configured to determine respectively one distance to at least three retroreflectors of the measuring apparatus from at least three spatially different observation locations, and wherein the evaluation unit is configured to determine the spatial position and orientation of the measuring apparatus from the determined distances.

Exemplary Embodiment 13

Method for determining the distribution of retroreflectors of a measuring apparatus, wherein a measuring apparatus according to any one of the preceding exemplary embodiments relating to a measuring apparatus is used in the method, wherein a target function is optimized in the method, wherein the target function has at least three position parameters and at least three orientation parameters for each retroreflector, wherein the target function is optimized over a plurality of orientations of the measuring apparatus in respect of a plurality of observation locations.

BRIEF DESCRIPTION OF THE DRAWINGS

The disclosure will now be described with reference to the drawings wherein.

DESCRIPTION OF EXEMPLARY EMBODIMENTS

Figure 1:
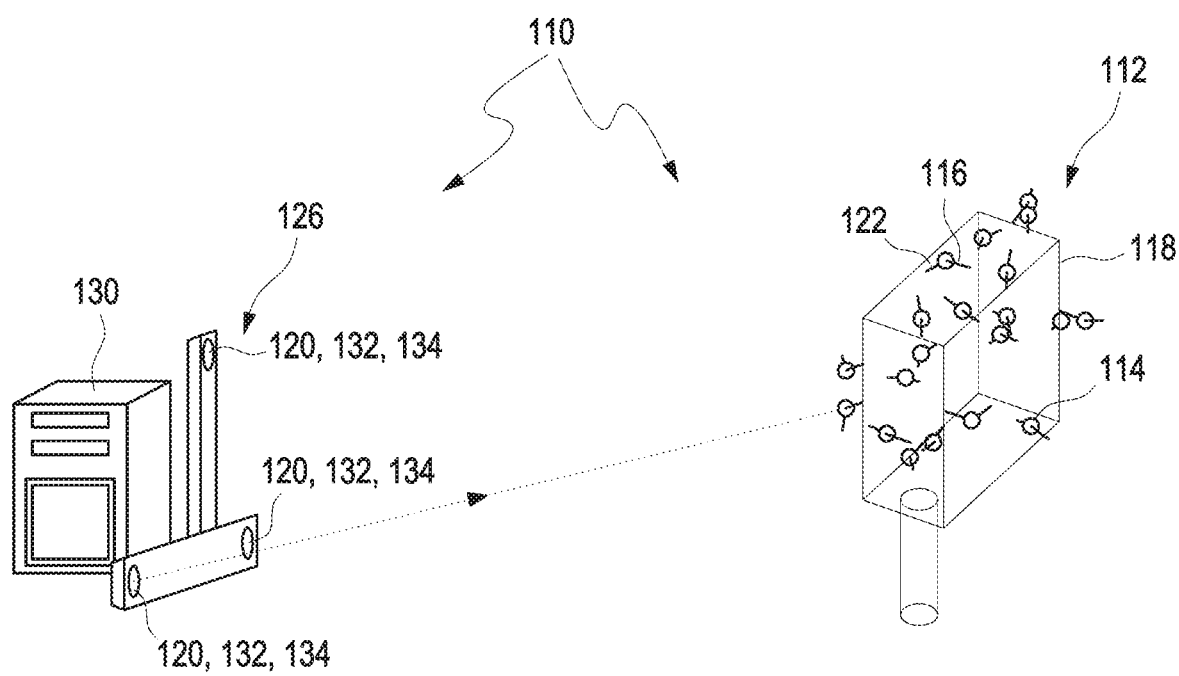
FIG. 1 shows a schematic illustration of an apparatus according to an exemplary embodiment of the disclosure.

Further details and features of the disclosure will become apparent from the following description of the exemplary embodiments. In this case, the respective features can be realized by themselves or as a plurality in combination with one another. The disclosure is not restricted to the exemplary embodiments. The exemplary embodiments are illustrated schematically in the figures. In this case, identical reference numerals in the individual figures designate identical or functionally identical elements or elements corresponding to one another with regard to their functions.

FIG. 1 shows a schematic illustration of an apparatus 110 according to an exemplary embodiment of the disclosure for determining at least one spatial position and orientation of at least one measuring apparatus 112 for determining object data of at least one test object including at least one distribution of retroreflectors 114. The test object can be, e.g., a component that is scanned by the measuring apparatus 112. The measuring apparatus 112 may include at least one sensor, which is configured to determine 3D coordinates of the surface. The measuring apparatus 112 may include at least one scanner, more particularly a line scanner. The measuring apparatus 112 may be a hand-guided measuring apparatus. By way of example, the retroreflectors 114 can be configured as markers. By way of example, the retroreflectors 114 may have and/or be cat's eye retroreflectors.

The retroreflectors 114 are arranged on the measuring apparatus 112. By way of example, the distribution may include 20, 40, or more retroreflectors 114. Typically, the number of retroreflectors 114 can be kept as low as possible for reasons of costs, weight and/or other technical reasons, for example a complexity of an evaluation.

The retroreflectors 114 can be arranged on the measuring apparatus 112 in such a way that a spacing between measuring apparatus 112 and each of the retroreflectors 114 is smaller than a given maximum spacing. The retroreflectors 114 can be arranged outside of the measuring apparatus 112. By way of example, the retroreflectors 114 can be connected to the measuring apparatus with at least one optional attachment 116. The retroreflectors 114 can be arranged as close as possible to the measuring apparatus 112. The retroreflectors 114 can be attached within a sphere with a diameter of less than 500 mm, by preference 250 mm, or outside of the measuring apparatus 112 with a spacing of 0 mm to 150 mm from the surface of the measuring apparatus 112. The retroreflectors 114 can be arranged in such a way that, with their physical extent, they do not collide with the measuring apparatus 112. By way of example, the retroreflectors can be arranged outside of a certain region, for example in the form of a box 118.

The retroreflectors 114 can be arranged at the measuring apparatus 112 in such a way that there is minimal mutual shadowing of the retroreflectors 114 and/or said retroreflectors are shadowed by the measuring apparatus 112 to a minimal extent. This condition may restrict an acceptable physical extent of the retroreflectors 114. In particular, this condition may have an influence on the number of observable retroreflectors 114.

The distribution has at least so many retroreflectors 114 that at least three retroreflectors 114 are observable from at least three spatially different observation locations 120 in at least 90% of all possible spatial orientations of the measuring apparatus 112. A minimum number of retroreflectors 114 of the distribution can be set by virtue of, in sum, sufficiently many distance measurements from all observation locations 120 being present for a calculation of orientation and positioning of the measuring apparatus 112. The distribution can have at least so many retroreflectors 114 that a number of retroreflectors observable at the at least three spatially different observation locations 120 in at least 90% of all possible spatial orientations of the measuring apparatus 112 is 3 to 40, more particularly 3 to 20 retroreflectors.

A distance range of the observation locations is 0.1 m to 30 m. The distance range can be set by a minimum and a maximum spacing of the observation locations 120 to the measuring apparatus 112. Typically, the distance range of the observation locations can be 2 m to 13 m. This requirement in respect of the distribution of the retroreflectors 114 may increase a minimum number of the required retroreflectors 114.

Each of the retroreflectors 114 has a maximum acceptance angle. Retroreflectors 114 may have a finite maximum acceptance angle relative to an alignment normal 122, within which they can receive light and reflect the latter again. By way of example, the maximum acceptance angle can be a half angle of up to 70°. By way of example, each of the retroreflectors 114 may have a maximum acceptance angle of 1° to 90°, typically of 60° to 90°.

Each of the retroreflectors 114 has a diameter of 1 mm to 50 mm. Typically, the extent of each of the retroreflectors 114 can have a diameter of 5 mm to 15 mm. The retroreflectors 114 can have such a high reflectance that an at least measurable signal is capturable in an overall region of all observation locations 120. This condition may lead to an increase in the physical extent of the retroreflectors 114 since the retroreflectors 114 are then able to capture more light and hence also reflect more light.

Figure 3:
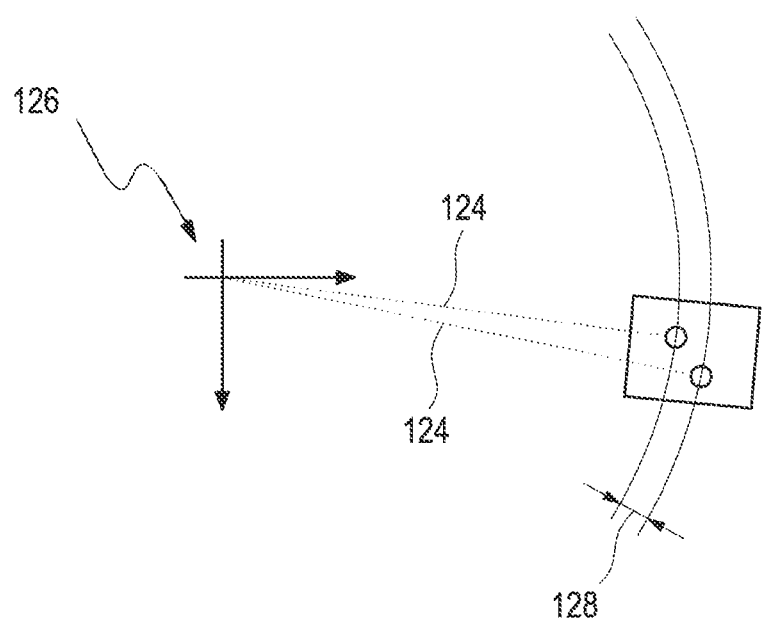
FIG. 3 shows examples of retroreflector distances.

The retroreflectors 114 are arranged in such a way that, for each of the observation locations 120, a minimum spacing of measured retroreflector distances 124 of the observable retroreflectors 114 is 0.1 mm to 50 mm. Typically, the minimum spacing of measured retroreflector distances 124 of the observable retroreflectors 114 can be 0.5 mm to 10 mm. FIG. 3 shows examples of two measured retroreflector distances 124. The retroreflector distance 124 can be the result of the distance measurement by a distance measuring apparatus 126 to one of the retroreflectors 114. A distance distribution of the measured retroreflector distances 124 can be such that an overshoot of a minimum spacing 128 of all measured retroreflector distances 124 is maximized for all spatial orientations of the measuring apparatus 112 and observation locations 120. The minimum spacing 128 can be a spacing of two spherical shells, on which the same lengths are measured relative to the observation location 120. Retroreflector distances are declared invalid and/or not measured below the minimum spacing 128. The minimum spacing 128 of the retroreflector distances 124 can set the spacing of the retroreflector distances 124 from which the distance measuring apparatus 126 can meaningfully determine the lengths. If undershot, no distances can be determined to the retroreflectors 114 involved in the undershoot.

Figure 2:
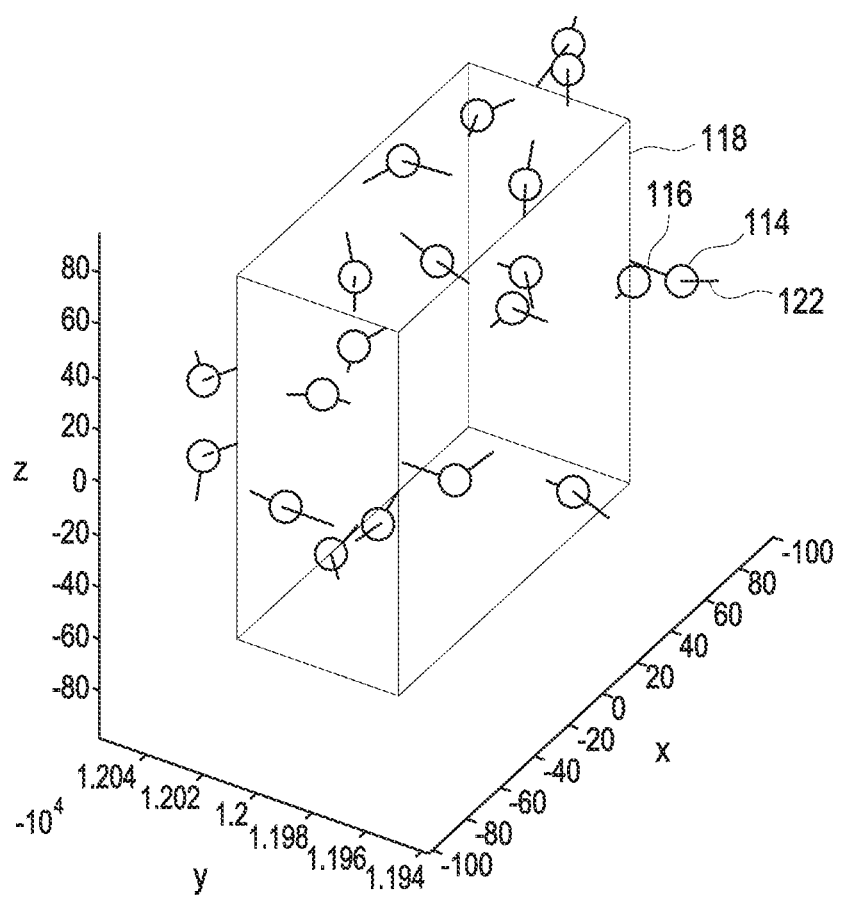
FIG. 2 shows a distribution of retroreflectors on a measuring apparatus according to an exemplary embodiment the disclosure.

FIG. 2 shows an exemplary embodiment in which the distribution of the retroreflectors 114 has the parameters set forth below: The number of retroreflectors 114 may be 20. All retroreflectors 114 can potentially be observed simultaneously by the distance measuring apparatus 126. A finite acceptance angle relative to the alignment normal 122 can be 70°. The retroreflectors 114 can be spherical with a 10 mm diameter dimension. The minimum spacing 128 of the measured retroreflector distances 124 can be 5 mm. If this minimum spacing 128 is undershot, all involved distances are classified as "not measured". A region in which the retroreflectors 114 may not be situated, in the form of a box 118 in this case, can have dimensions of 140 mm×60 mm×140 mm (x-axis, x y-axis, and x z-axis). All retroreflectors 114 can be arranged at a spacing of <125 mm from the center of this region. For such an arrangement of the retroreflectors 114, at least three distances may be measurable in more than 90% of all alignments for a single observation location 120 with spacings of 2 to 12 m from the measuring apparatus 112. By way of example, the 20 retroreflectors 114 can be arranged as specified in Table 1 above and as graphically presented in FIG. 2.

As shown in FIG. 1, the apparatus 110 includes the measuring apparatus 112. The apparatus 110 can be configured to track the measuring apparatus 112. In particular, there can be a continuous measurement of a 6D information item, i.e., the spatial position and orientation, of the measuring apparatus 112 that is movable in space. In particular, there can be 6D-tracking of the measuring apparatus 112, in which the spatial position and orientation, for example three Cartesian spatial coordinates, and the spatial alignment or orientation, for example three spatial alignments, of the measuring apparatus 112 are determined and tracked in time.

The apparatus 110 includes at least one active distance measuring apparatus 126 and at least one evaluation unit 130. The distance measuring apparatus 126 is configured to determine respectively one distance to at least three retroreflectors 114 of the measuring apparatus 112 from at least three spatially different observation locations 120. The distance measuring apparatus 126 can be configured to be able to determine a plurality of distance measurements from an observation location 120 to a plurality of retroreflectors 114, either simultaneously or with a negligible delay within the scope of the application.

By way of example, the distance measuring apparatus 126 may include a LIDAR unit. The distance measuring apparatus 126 can include at least one illumination apparatus 132, which is configured to illuminate at least one retroreflector 114 of the measuring apparatus 112. An illumination light beam generated by the illumination apparatus 132, which illuminates one of the retroreflectors 114, is shown in exemplary fashion in FIG. 1. The illumination apparatus 132 can have at least one light source. The illumination apparatus 132 can have at least one FMCW light source. The illumination apparatus 132 can have at least one adjustable (tuneable) laser source, for example at least one distributed feedback (DFB) laser diode or a distributed Bragg reflector (DBR) laser diode.

The distance measuring apparatus 126 can have at least one sensor element 134, which is configured to detect at least one light beam reflected by the retroreflectors 114. The sensor element 134 can have at least one photodiode.

The evaluation unit 130 can be configured to evaluate signals generated by the distance measuring apparatus 126. By way of example, one or more electronic connections between the distance measuring apparatus 126 and the evaluation unit 130 can be provided for this purpose. The evaluation unit 130 can include for example at least one data processing apparatus, for example at least one computer or microcontroller. The data processing apparatus can have one or more volatile and/or non-volatile data memories, wherein the data processing apparatus can be configured for example in terms of programming to actuate the distance measuring apparatus. The evaluation unit 130 can furthermore include at least one interface, for example an electronic interface and/or a human-machine interface, e.g., an input/output apparatus such as a display and/or a keyboard. The evaluation unit 130 can be constructed for example centrally or else in a decentralized manner. Other configurations are also conceivable. The evaluation unit 130 can have at least one A/D converter.

The evaluation unit 130 is configured to determine the spatial position and orientation of the measuring apparatus 112 from the distances determined by the distance measuring apparatus 126. The evaluation unit 130 can be configured to determine the spatial position and orientation of the measuring apparatus 112 using a trilateration or multilateration method. Such methods are known to the person skilled in the art.

It is understood that the foregoing description is that of the exemplary embodiments of the disclosure and that various changes and modifications may be made thereto without departing from the spirit and scope of the disclosure as defined in the appended claims.

LIST OF REFERENCE NUMBERS

110 Apparatus
112 Measuring apparatus
114 Retroreflector
116 Attachment
118 Box
120 Observation locations
122 Alignment normal
124 Retroreflector distances
126 Distance measuring apparatus
128 Minimum spacing
130 Evaluation unit
132 Illumination apparatus

What is claimed is:

1. A measuring apparatus for determining object data of at least one test object, the measuring apparatus comprising:
   at least one distribution of retroreflectors;
   the retroreflectors being arranged on the measuring apparatus;
   the at least one distribution of retroreflectors having at least so many of the retroreflectors that at least three retroreflectors are observable from at least three spatially different observation locations in at least 90% of all possible spatial orientations of the measuring apparatus;
   a distance range of the at least three spatially different observation locations being 0.1 m to 30 m;
   each of the retroreflectors having a maximum acceptance angle;
   each of the retroreflectors having a diameter of 1 mm to 50 mm; and
   the retroreflectors being arranged such that, for each of the at least three spatially different observation locations, a minimum spacing of measured retroreflector distances of observable retroreflectors is 0.1 mm to 50 mm.

2. The measuring apparatus according to claim 1, wherein the at least one distribution of retroreflectors has at least so many of the retroreflectors that a number of the retroreflectors that are observable at the at least three spatially different observation locations in the at least 90% of all of the possible spatial orientations of the measuring apparatus is 3 to 40 of the retroreflectors.

3. The measuring apparatus according to claim 1, wherein the at least one distribution of retroreflectors has at least so many of the retroreflectors that a number of the retroreflectors that are observable at the at least three spatially different observation locations in the at least 90% of all of the possible spatial orientations of the measuring apparatus is 3 to 20 of the retroreflectors.

4. The measuring apparatus according to claim 1, wherein the distance range of the at least three spatially different observation locations is 2 m to 13 m.

5. The measuring apparatus according to claim 1, wherein the maximum acceptance angle of each of the retroreflectors is 1° to 90°.

6. The measuring apparatus according to claim 1, wherein the maximum acceptance angle of each of the retroreflectors is 60° to 90°.

7. The measuring apparatus according to claim 1, wherein each of the retroreflectors has the diameter of 5 mm to 15 mm.

8. The measuring apparatus according to claim 1, wherein a minimum spacing of measured retroreflector distances of the retroreflectors that are observable is 0.5 mm to 10 mm.

9. The measuring apparatus according to claim 1, wherein:
- the retroreflectors are arranged at the measuring apparatus such that a spacing between the measuring apparatus and each of the retroreflectors is less than a predetermined maximum spacing, and
- the retroreflectors are arranged within a sphere or at a surface of the measuring apparatus.

10. The measuring apparatus according to claim 1, wherein the retroreflectors are cat's eye retroreflectors.

11. An apparatus for determining at least one spatial position and orientation of at least one measuring apparatus, the apparatus comprising:
- at least one measuring apparatus according to claim 1;
- at least one active distance measuring apparatus configured to determine respectively one distance to the at least three retroreflectors of the measuring apparatus at the at least three spatially different observation locations; and
- at least one evaluation unit configured to determine a spatial position and orientation of the measuring apparatus from the determined distances.

12. A Method for determining a distribution of retroreflectors of the measuring apparatus according to claim 1, the method comprising:
- optimizing a target function, the target function having at least three position parameters and at least three orientation parameters for each retroreflector; and
- optimizing the target function over a plurality of orientations of the measuring apparatus with respect to a plurality of observation locations.

* * * * *